United States Patent [19]

Maslenok et al.

[11] 3,852,153

[45] Dec. 3, 1974

[54] CONTROL ROD DRIVE IN A NUCLEAR REACTOR

[76] Inventors: Boris Arkadievich Maslenok, Kolpino, ulitsa V. Slutskoi, 34, kv. 40; Anatoly Sergeevich Khegai, Kolpino, ulitsa Vokzalnaya, 11, kv. 10; Viktor Grigorievich Zlobin, Kolpino, ulitsa V. Slutskoi, 38, kv. 223; Viktor Georgievich Mednitsky, Kolpino, prospekt Lenina, 9/15, kv. 15; Lev Isaakovich Genkin, 2 Sovetskaya ulitsa, 18/2, kv. 5; Nikolai Fedorovich Petrichenko, Pushkin, Leningradskaya ulitsa, 18, kv. 9, all of Leningrad; Boris Ivanovich Mitrofanov, ulitsa Mira, 8, kv. 31, Podolsk Moskovskoi oblasti, all of U.S.S.R.

[22] Filed: Apr. 5, 1972

[21] Appl. No.: 241,236

[52] U.S. Cl. .............................................. 176/36 R
[51] Int. Cl. .............................................. G21c 7/12
[58] Field of Search..... 176/36 R, 36 C, 36 S, 36 W

[56] References Cited
UNITED STATES PATENTS
3,020,888 2/1962 Braun .............................. 176/36 R
3,158,545 11/1964 Jones .............................. 176/36 R
3,364,120 1/1968 Winders et al. ..................... 176/36 R
3,527,670 9/1970 Winders ............................ 176/36 R

FOREIGN PATENTS OR APPLICATIONS
1,805,976 5/1970 Germany .......................... 176/36 C

*Primary Examiner*—Harvey E. Behrend
*Attorney, Agent, or Firm*—Waters, Roditi, Schwartz & Nissen

[57] ABSTRACT

The invention relates to the control rod drive of a nuclear reactor.

The drive according to the invention is characterized in that the arrangement to prevent spontaneous movement of the control rod of the nuclear reactor, which is located in the lower part of the containment casing of the drive, is made in the form of a piston bearing against a rest face and housed in a circular chamber which is formed in the lower part of the containment casing and has in its upper portion a tapered surface for arresting the drive rod with the aid of wedging members, while at its bottom the chamber has the channels communicating with the reactor space, a partition tube being placed around the drive rod coaxially with the piston.

This simplifies the design of the drive and raises its reliability under normal regulation and emergency protection conditions of the reactor.

1 Claim, 2 Drawing Figures

PATENTED DEC 3 1974

3,852,153

CONTROL ROD DRIVE IN A NUCLEAR REACTOR

The invention relates to drives of the control rods of nuclear reactors, having an arrangement to prevent spontaneous movement of the control rod in the active zone of the reactor in case of an emergency pressure differential caused, in the active zone by a leakage in the containment casing of the drive.

Known in the art is a control rod drive in a nuclear reactor, comprising a containment casing wherein mounted are a driving means with a drive rod connected therewith to effect the movements of the control rod, and an arrangement to prevent spontaneous movements of the control rod from the active zone of the reactor.

The arrangement to prevent spontaneous movement of the control rod from the active zone is made in this drive in the form of a single-way coupling with circumferentially arranged wedging members. Under normal operating conditions the single-way coupling engages the driving means with a screw-and-nut pair of the drive rod. If the force in the rod exceeds the force from the driving means, the driven screw-and-nut pair becomes a driving one and changes the orientation of the wedging members of the coupling, which in this case are jammed between the housing of the coupling and the rotating parts of the drive, thus stopping the drive rod.

The disadvantage of the known drive consists in its insufficient reliability which depends on many factors. Thus, for example, insignificant variations in the accuracy of the wedges of the coupling and of other elements actuating these wedges, reduced elasticity of the springs tightening these wedges together, presence of mechanical particles on the surfaces contacting the wedges, and vibration of the drive may cause instantaneous seizure and score of the contacting surfaces and self-jamming of the drive under normal operating conditions, which will disturb the regulation of the reactor.

It is the object of the present invention to provide a drive for the control rod of a nuclear reactor with an arrangement to prevent spontaneous movement of the control rod in the active zone in case of an emergency pressure differential caused in this zone by a leakage in the containment casing of the drive, said arrangement having no kinematic linkage with the other movable parts of the drive under normal regulation conditions.

With this object in view, in a control rod drive of a nuclear reactor the arrangement to prevent spontaneous movement of the control rod, according to the invention, is made in the form of a piston bearing against a rest face and housed in a circular chamber which is formed in the containment casing and has in its upper portion a tapered surface for arresting the drive rod with the aid of wedging members, while at its bottom it has channels communicating with the reactor space, a partition tube being placed around the drive rod coaxially with the piston.

Owing to such a design, the members of the arrangement to prevent spontaneous movement of the control rod in the active zone of the reactor do not interact with the movable parts of the drive under working regulation conditions, thus ensuring reliable functioning of the drive.

In one of the preferred versions of the invention the wedging members can be made in the form of balls located in radial slots of the piston and interacting with the tapered surface of the circular chamber when the piston is displaced. This version facilitates the manufacture and assembly of the drive. It is expedient that the upper part of the piston should be tapered in congruence with the tapered surface of the upper portion of the circular chamber. To ensure return of the wedging members and the piston to their initial position the piston may be springed against the bottom rest face of the chamber of the containment casing wherein the channels are made for communication with the reactor space.

Employment of the invention permits simplifying the design of the drive and raising its operating reliability under normal regulation and emergency protection conditions of the reactor.

For a better understanding of the idea of the invention, described below in one of the embodiments of the drive, according to the invention, with references to the appended drawings, wherein.

Figure 1:
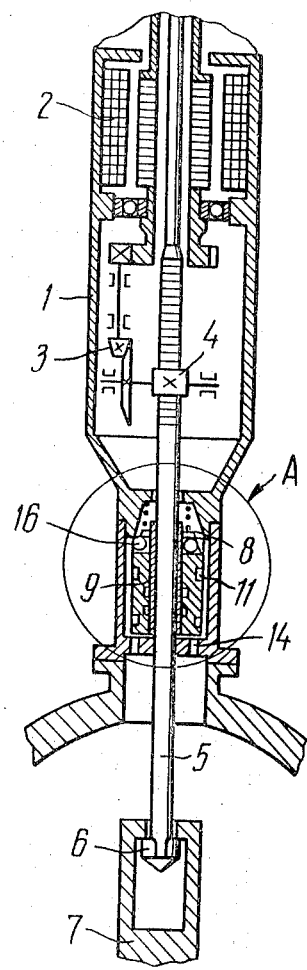
FIG. 1 is a general view of the control rod drive in a nuclear reactor, longitudinal section.
Figure 2:
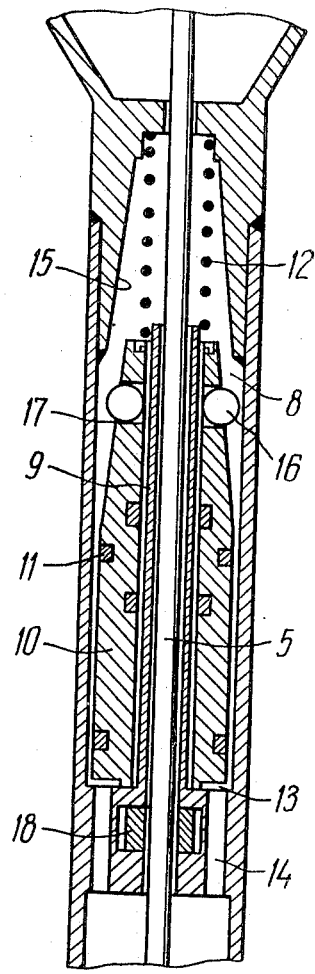
FIG. 2 shows part of the drive casing (designated as A in FIG. 1) wherein mounted is the arrangement to prevent spontaneous movement of the control rod.

The control rod drive of a nuclear reactor comprises a containment casing 1 (FIG. 1) wherein housed is the driving means including an electric motor 2 which through a speed reducer 3 and a rack gear 4 imparts reciprocatory movement to a drive rod 5, at whose bottom end the control rod 7 is suspended through a connecting link 6. The arrangement to prevent spontaneous movement of the control rod is located in the lower part of casing 1, wherein formed is a chamber 8 (FIG. 2) having a tapered surface in its upper portion. Placed in the chamber 8 is a partition tube 9, and thus formed annular space of chamber 8 accommodates a piston 10. Piston 10 is sealed by packing rings 11 and is pressed by a spring 12 against a rest face 13 wherein channels 14 are made said channels connecting the chamber 8 with the reactor space. The upper part of piston 10 is tapered in congruence with the tapered surface 15 of the upper portion of the chamber 8, and is fitted with balls 16 placed in radial slots 17 of the piston 10. The clearance between the partition tube 9 and the drive rod 5 in the chamber 8 is sealed by a washer 18.

In normal regulation service of the drive piston 10 under its gravity and the pressure of the spring 12 bears against the rest face 13. In case of leakage in the containment casing 1 above said packing rings 11 causing an emergency pressure differential in the active zone, there is formed a difference of pressure of the heat-transfer agent under and over the piston in the chamber 8. Under the effect of the pressure difference the heat-transfer agent through the channels 14 penetrates into the space of chamber 8 under the piston 10 and pushes it upward. As the piston 10 rises, balls 16 come into contact with the tapered surface 15, and are then shifted aside and compressed against the surface of the drive rod 5, thus precluding its upward movement.

After the emergency leakage in the containment casing 1 and the pressure differential are eliminated, the electric motor 2 through the speed reducer 3 and the rack gear 4 pushes the drive rod 5 into its initial position, to continue normal regulation work of the drive.

What we claim is:

1. A control rod drive in a nuclear reactor comprising in combination, a pressurized nuclear reactor; a casing affixed to said nuclear reactor; pressurized driving means in said casing; a drive rod linked to said driving means; a control rod connected to said drive rod; and means for preventing spontaneous movement of said control rod and comprising: a chamber at the bottom of said casing, a piston in said chamber, spring means for abutting said piston against a predetermined surface in the lower end of said chamber, said chamber, piston and spring means being coaxial with said drive rod, said piston having a tapered surface at the top of said piston and having radial slots, said chamber having a tapered top portion mateable with the tapered surface of said piston, ball-shaped members in said radial slots of said piston for rolling against the tapered portion of said chamber into contact with said drive rod when said driving means is depressurized and said piston is moved upwardly by the pressure in said nuclear reactor, said ball-shaped members holding said drive rod and said control rod in locked position for preventing spontaneous movement of said control rod, and a partition tube in said chamber, said partition tube being fixedly positioned to the lower end of said chamber and coaxial with said drive rod and said piston for preventing said ball-shaped members from contacting said drive rod and holding said drive rod in locked position when said drive means is under pressure and the piston is at the lower end of said chamber, said chamber having openings communicating with the active zone of the nuclear reactor and with the pressurized driving means, said partition tube having a length less than the axial length of said chamber.

* * * * *